United States Patent [19]

Meeks et al.

[11] Patent Number: 5,539,213

[45] Date of Patent: Jul. 23, 1996

[54] PROCESS AND APPARATUS FOR LASER ANALYSIS OF SURFACE HAVING A REPETITIVE TEXTURE PATTERN

[75] Inventors: Steven W. Meeks; Thao A. Nguyen; Fior D. Sargent, all of San Jose, Calif.

[73] Assignee: International Business Machines Corporation, Armonk, N.Y.

[21] Appl. No.: 379,419

[22] Filed: Jan. 27, 1995

[51] Int. Cl.$^6$ .................................................. G01N 21/86
[52] U.S. Cl. ............................ 250/559.23; 250/559.27; 356/376
[58] Field of Search ..................... 250/559.22, 559.23, 250/559.27; 356/376, 381

[56] References Cited

U.S. PATENT DOCUMENTS

| | | | |
|---|---|---|---|
| 3,782,827 | 1/1974 | Nisenson et al. | 356/376 |
| 4,180,830 | 12/1979 | Meeks | 358/128 |
| 5,062,021 | 10/1991 | Ranjan et al. | 360/135 |
| 5,108,781 | 4/1992 | Ranjan et al. | 427/53.1 |
| 5,270,560 | 12/1993 | Cheng . | |

FOREIGN PATENT DOCUMENTS

WO93/21629  10/1993  European Pat. Off. .......... G11B 5/82

OTHER PUBLICATIONS

H. M. van Driel, J. E. Sipe and J. F. Young, Laser–Induced Periodic Surface Structure on Solids: A Universal Phenomenon, The American Physical Society, Physical Review Letters, vol. 49, No. 26, pp. 1955–1958, Dec. 27, 1982.

J. F. Young, J. S. Preston, H. M. vanDriel & J. E. Sipe, Laser–induced Periodic Surface Structure. II. Experiments on Ge, Si, Al, and Brass, The American Physical Society, Physical Review B, vol. 27, No. 2, pp. 1155–1172, Jan. 15, 1983.

*Primary Examiner*—Edward P. Westin
*Assistant Examiner*—Stephen Calogero
*Attorney, Agent, or Firm*—Thomas R. Berthold

[57] ABSTRACT

An analyzing laser system determines a physical characteristic of a repetitive texture pattern formed on a substrate surface. In one embodiment the system uses diffracted laser light to compute the average height of texturing bumps on a substrate surface. A laser beam is directed to the substrate surface and overlaps a group of individual marks or bumps formed in a repetitive pattern. A scanning linear photodector array receives light diffracted from the surface. The digitized output of the array is the angular distribution of diffracted light intensities. In the preferred embodiment for determining the average height of laser-induced bumps formed on a specular magnetic recording disk substrate, the angular positions of the first and second diffraction peaks or rings are determined and the intensities are integrated around those diffraction peaks or rings. These position and integrated intensity values are then compared to position and integrated intensity values for bumps of known height on calibration disk substrates. If the individual marks or bumps making up the repetitive pattern are also symmetrical then the angular distribution of diffracted light intensities is the square of the absolute value of the Fourier transform of the cross sectional profile of the bumps. Mathematical operations, including an inverse Fourier transform, are then performed on the digitized array output to yield the average cross sectional shape of the bumps illuminated by the analyzing laser.

13 Claims, 8 Drawing Sheets

(PRIOR ART)

PROCESS AND APPARATUS FOR LASER ANALYSIS OF SURFACE HAVING A REPETITIVE TEXTURE PATTERN

RELATED APPLICATIONS

This application and concurrently filed applications, Ser. No. 08/379,242 (abandoned with filing of continuation application Ser. No. 08/419,885 filed Apr. 11, 1995) and Ser. No. 08/379,410 are based on a common specification. This application is directed to the "PROCESS AND APPARATUS FOR LASER ANALYSIS OF SURFACE HAVING A REPETITIVE TEXTURE PATTERN", application Ser. No. 08/419,885 is directed to the "PROCESS AND APPARATUS FOR CONTROLLED LASER TEXTURING OF MAGNETIC RECORDING DISK", and application Ser. No. 08/379,410 is directed to the "MAGNETIC RECORDING DISK HAVING TEXTURED TEST BAND FOR CONTROLLING TEXTURE IN THE SLIDER LANDING ZONE."

Co-pending application, U.S. Ser. No. 08/150,525 filed Nov. 10, 1993, describes a process for using a diode-pumped laser for texturing the disk substrate with an array of spaced-apart bumps. Co-pending application, U.S. Ser. No. 08/149,851 filed Nov. 10, 1993, describes a process for laser texturing glass disk substrates.

TECHNICAL FIELD

This invention relates to a surface texture analyzing laser system for determining the physical shape of a repetitive textured pattern from laser light diffracted from the textured substrate surface.

BACKGROUND OF THE INVENTION

Disk drives, also called disk files, are information storage devices that use a rotatable disk with concentric data tracks containing the information, a head or transducer for reading and/or writing data onto the various tracks, and an actuator connected to a carrier for the head for moving the head to the desired track and maintaining it over the track centerline during read or write operations. There are typically a plurality of disks separated by spacer rings and stacked on a hub that is rotated by a disk drive motor. A housing supports the drive motor and head actuator and surrounds the head and disk to provide a substantially sealed environment for the head-disk interface.

In conventional magnetic recording disk drives, the head carrier is an air-bearing slider that rides on a bearing of air above the disk surface when the disk is rotating at its operational speed. The slider is maintained next to the disk surface by a relatively fragile suspension that connects the slider to the actuator. The slider is either biased toward the disk surface by a small spring force from the suspension, or is "self-loaded" to the disk surface by means of a "negative-pressure" air-bearing surface on the slider.

To improve the wear resistance of the disk, as well as to maintain consistent magnetic properties, it is desirable to make the disk surface as smooth as possible. However, a very smooth disk surface creates a problem known as "stiction". This means that after the slider has been in stationary contact with the disk for a period of time, the slider tends to resist translational movement or "stick" to the disk surface. Stiction is caused by a variety of factors, including static friction and adhesion forces between the disk and slider created by the lubricant on the disk. Stiction in a disk drive can result in damage to the head or disk when the slider suddenly breaks free from the disk surface when disk rotation is initiated. In addition, because the suspension between the actuator and the slider is relatively fragile in order to permit the slider to fly above the disk surface, sudden rotation of the disk can also damage the suspension. In some disk drives, such as low-power disk drives used in laptop and notebook computers, the drive motor may simply be unable to initiate rotation or achieve operating speed because of the adhesion forces that cause stuck sliders or excessive drag.

Contact start/stop (CSS) disk drives operate with the slider in contact with the disk surface during start and stop operations when there is insufficient disk rotational speed to maintain the air bearing. To minimize the effect of stiction, CSS disk drives often use a dedicated textured "landing zone" where the slider is parked when the drive is not operating. Typically, the landing zone is a specially textured nondata region of the disk. The disk substrate is textured before deposition of the magnetic layer and other layers that make up the magnetic recording disk. These layers replicate the texture of the underlying substrate and thus reduce the stiction when the slider is resting on the disk.

One technique for texturing the disk substrate is by pulsed laser radiation. U.S. Pat. No. 5,108,781, assigned to Magnetic Peripherals, Inc., describes a process for laser texturing by forming overlapping pits or craters in the substrate. IBM's copending application, Ser. No. 08/150,525, describes a process for using a diode-pumped laser for texturing the disk substrate with an array of spaced-apart bumps. IBM's copending application, Ser. No. 08/149,851, describes a process for laser texturing glass disk substrates. The problem discovered with laser textured disk substrates is that the average height of the laser-induced bumps can not be controlled from substrate to substrate, even when the substrates are presumably of the same material composition. Since the minimization of stiction is critically dependent on the average height of the texturing bumps, it is necessary to develop a process that allows a texturing pattern with a known average bump height to be formed on all disks that are manufactured, thus assuring reliable operation of the disk drives into which the disks are incorporated.

SUMMARY OF THE INVENTION

The invention is an analyzing laser system and process for determining, from diffracted laser light, a physical characteristic of a repetitive textured pattern on a substrate surface. A laser beam is directed to the substrate surface and overlaps a group of individual marks or bumps formed in a repetitive pattern. A scanning linear photodector array receives light diffracted from the surface. The digitized output of the array is the angular distribution of diffracted light intensities. In the preferred embodiment for determining the average height of laser-induced bumps formed on a specular magnetic recording disk substrate, the angular positions of the first and second diffraction peaks or rings are determined and the intensities are integrated around those diffraction peaks or rings. These position and integrated intensity values are then compared to position and integrated intensity values for bumps of known height on calibration disk substrates. If the individual marks or bumps making up the repetitive pattern are also symmetrical then the angular distribution of diffracted light intensities is the square of the absolute value of the Fourier transform of the cross sectional profile of the bumps. Mathematical operations, including an inverse Fourier transform, are then performed on the digitized array output to yield the average cross sectional shape of the bumps illuminated by the analyzing laser.

When used in a magnetic recording disk laser texturing system the texture analyzing laser system is used on a test band on the disk and the analyzing laser system's output is used to modify the laser energy to the texturing laser that forms the textured pattern in the landing zone on the disk.

DETAILED DESCRIPTION OF THE INVENTION

Prior Art

Figure 1:
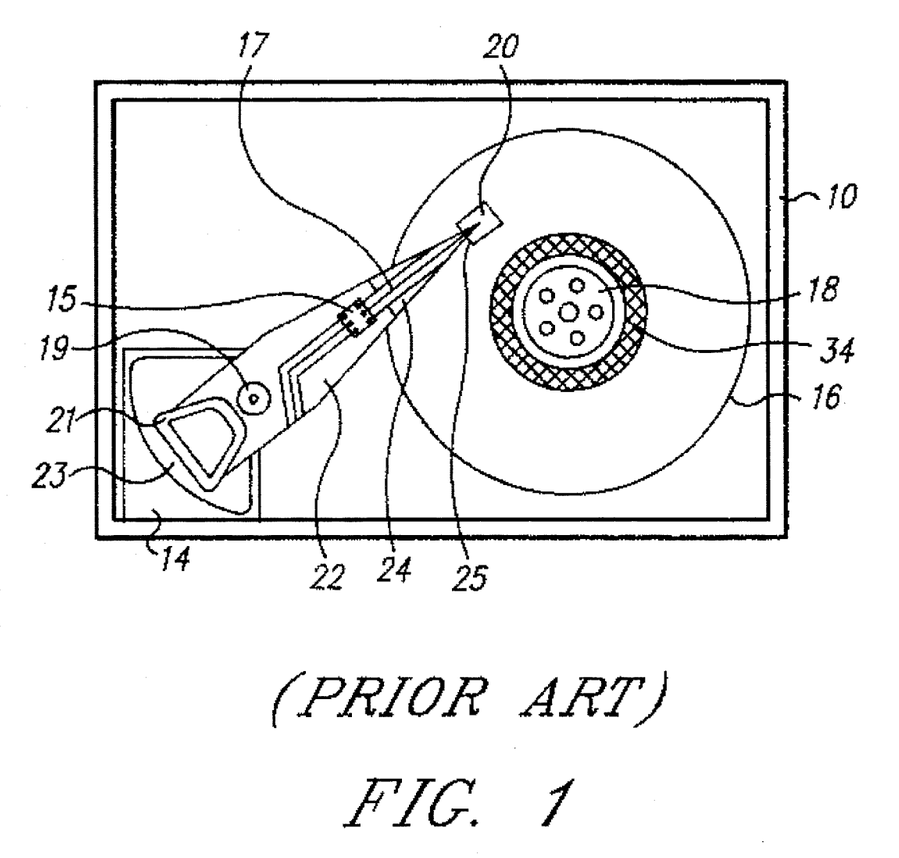
FIG. 1 is a schematic of a contact start/stop (CSS) disk drive showing a disk with a textured band that serves as the CSS landing zone.

Referring first to FIG. 1, there is illustrated a conventional disk drive having a disk with a textured landing zone. For ease of illustration and explanation, the disk drive depicted in FIG. 1 is shown as having a single recording head and associated disk surface, although conventional disk drives typically have multiple heads and disks. The disk drive comprises a base 10 to which are secured a disk drive motor with a rotatable spindle 18 and a head actuator 14. A magnetic recording disk 16 is connected to the spindle 18 and is rotated by the drive motor.

The disk 16 is typically a thin film disk comprising a substrate, such as a disk blank made of glass, ceramic, or an aluminum-magnesium (AlMg) alloy with a nickel-phosphorous (NiP) surface coating, and a cobalt-based magnetic alloy film formed by sputter deposition over the substrate. A protective overcoat, such as a sputter-deposited amorphous carbon film, is formed over the magnetic layer to provide corrosion resistance and wear resistance. A liquid fluoroether lubricant is also maintained on the surface of the protective disk overcoat. The disk 16 may also include a sputter-deposited underlayer, such as a layer of chromium (Cr) or a chromium-vanadium (CrV) alloy, between the substrate and the magnetic layer and a sputter-deposited adhesion layer, such as a Cr, tungsten (W) or titanium (Ti) layer, between the magnetic layer and the protective overcoat.

A read/write head or transducer 25 is formed on the trailing end of an air-bearing slider 20. Transducer 25 may be an inductive read and write transducer or an inductive write transducer with a magnetoresistive (MR) read transducer formed by thin film deposition techniques as is known in the art. The slider 20 is connected to the actuator 14 by a rigid arm 22 and a suspension 24. The suspension 24 provides a biasing force that urges the slider 20 onto the surface of the recording disk 16. During operation of the disk drive, the drive motor rotates the disk 16 at a constant speed, and the actuator 14 pivots on shaft 19 to move the slider 20 generally radially across the surface of the disk 16 so that the read/write transducer 25 may access different data tracks on disk 16. The actuator 14 is typically a rotary voice coil motor (VCM) having a coil 21 that moves through the fixed magnetic field of magnet assembly 23 when current is applied to the coil. The data detected from disk 16 by the transducer 25 is processed into a data readback signal by signal amplification and processing circuitry in the integrated circuit chip 15 located on arm 22. The signals from transducer 25 travel via flex cable 17 to chip 15, which sends its output signals via cable 19.

To improve the wear resistance of the disk 16, as well as to maintain consistent magnetic properties in the data region, it is desirable to make the disk surface as smooth as possible. However, a very smooth disk surface in a CSS disk drive creates what is called "stiction". This means that after the slider 20 has been in stationary contact with the disk 16 for a period of time, the slider tends to resist translational movement or "stick" to the disk surface. Stiction is caused by a variety of factors, including static friction and adhesion forces between the disk and slider created by the lubricant or by capillary condensation of atmospheric water vapor. Stiction in a CSS disk drive can result in damage to the head 25 or disk 16 when the slider 20 suddenly breaks free from the disk surface when disk rotation is initiated. Because the suspension 24 between the actuator 14 and the slider 20 is relatively fragile to permit the slider to fly above the disk surface, sudden rotation of the disk 16 can also damage the suspension 24.

The conventional solution to the stiction problem is to texture the disk. Typically, this is done by abrasive polishing of the disk substrate, which results in a texturing of the conforming layers deposited over the substrate. More recently, as described in U.S. Pat. No. 5,108,781, assigned to Magnetic Peripherals, Inc., the disk substrate may be textured by laser heating to form a pattern of overlapping pits in the substrate surface. The sputter-deposited layers formed over the textured substrate replicate the texture of the substrate and reduce the stiction when the slider 20 is resting on the disk 16.

In a CSS disk drive, the disk 16 has a dedicated textured landing zone 34 near the disk inside diameter away from the disk data region. The parking location for the actuator 14 when the disk drive motor is stopped is with the slider 20 in contact with the textured surface of the landing zone 34. At this location, the slider 20 is not in contact with the smooth data region of the disk, and the disk drive can be started without damage caused by stiction.

Preferred Embodiment

Figure 2:
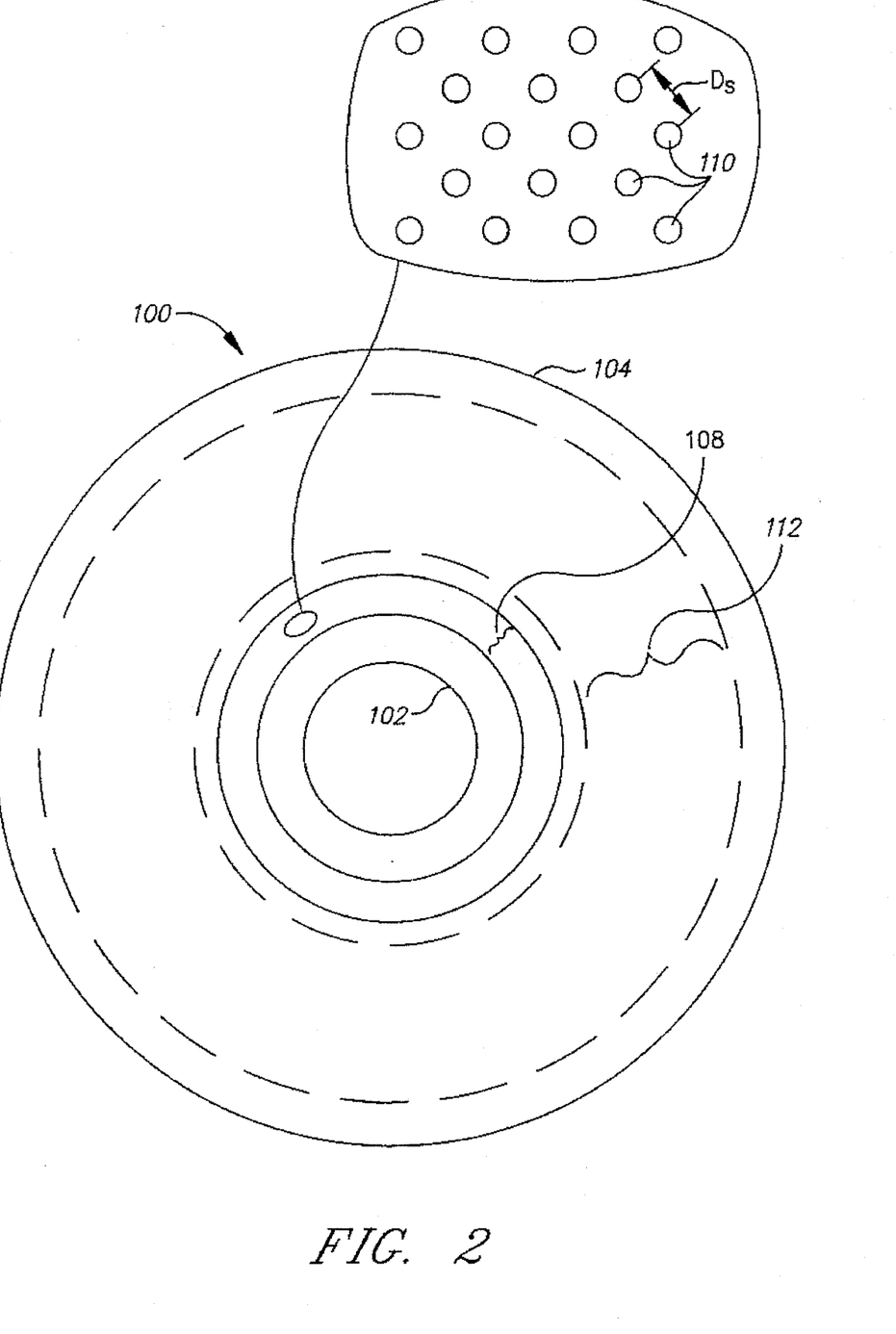
FIG. 2 is a plan view of a disk illustrating the annular data region and the radially spaced annular textured band, with a portion of the textured band expanded to show individual laser-induced texturing bumps.

FIG. 2 is a view of a magnetic recording disk 100 having an inside diameter 102, an outside diameter 104, and a laser textured annular band 108 for use as the slider landing zone. The disk 100 has an annular data region 112 (shown between the dashed circumferential lines). The annular textured band 108 is radially spaced from the disk data region 112 and is located near the inside diameter 102 of the disk. A portion of textured landing zone 108 is shown in the enlarged view and comprises a plurality of like generally symmetrically-shaped, laser-induced bumps 110. Each of the bumps 110 is formed by a single laser pulse and results in a bump that can be formed with a diameter in the range of approximately 5–30 microns. The bumps 110 have an average spacing or separation, denoted as $D_s$, in the range of approximately 25–100 microns, depending on the disk rotational rate and laser pulse repetition rate during the laser texturing, as described in the copending application Ser. No. 08/150,525. Alternatively, the bumps may be overlapping, as described in the previously cited '781 patent. The bumps are formed by pulsing a laser beam on the disk surface while the disk rotates. The position of the laser is fixed and the disk is supported on a translation stage that moves radially while the disk rotates so that the bumps are formed in a spiral track across the radial zone or band 108. If the disk is a conventional 3.5 in. disk the landing zone 108 has a typical radial dimension of approximately 3 mm. The bumps 110 are formed by the pulsed laser heating of the NiP coating of a conventional AlMg disk blank. However, the bumps may also be formed on other substrate materials, such as glass or ceramic (e.g., Memcor brand substrate from Corning Glass). Also, instead of being formed on the disk substrate surface, the bumps may instead be formed on one of the subsequently deposited disk layers, such as the disk protective overcoat.

Figure 3A:
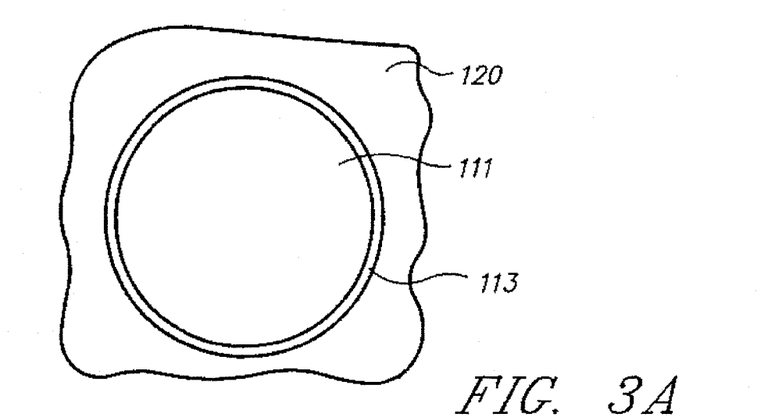
FIGS. 3A–3B represent top and sectional views, respectively, of one type of laser-induced bump having a crater-like shape.
Figure 3B:
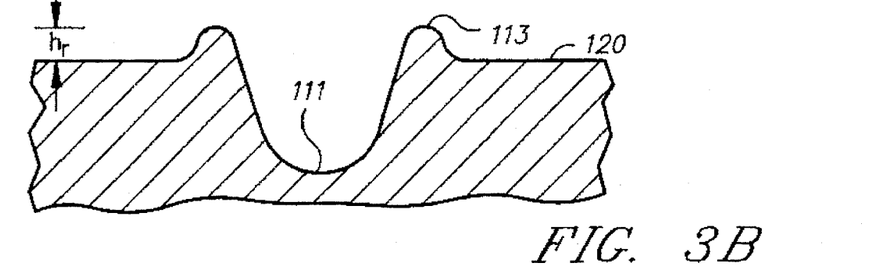

FIG. 3A is an illustration of one type of laser-induced bump 111 formed on the smooth specular surface 120 of the disk, and FIG. 3B is a cross-sectional profile of bump 111. The bump 111 has the general shape of a crater with a circumferential rim 113 that is raised above the surface 120 of the disk by a height represented by $h_r$ in FIG. 3B.

Figure 4A:
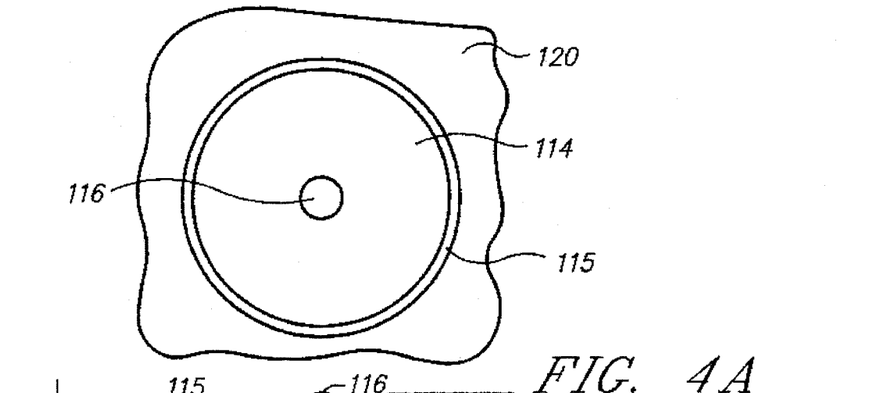
FIGS. 4A–4B represent top and sectional views, respectively, of another type of laser-induced bump having a crater-like shape, but with a central apex extending above the crater rim.
Figure 4B:
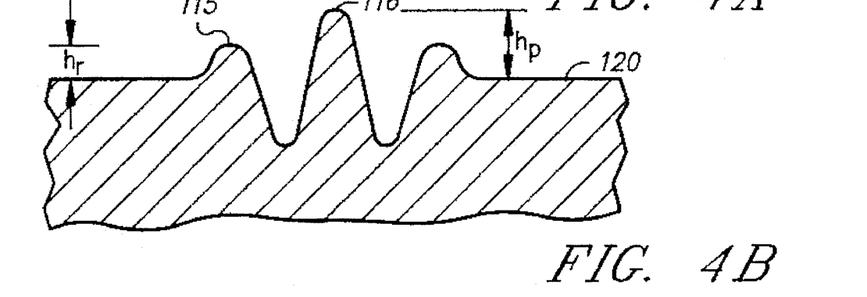

FIG. 4A is a depiction of another type of laser-induced bump 114 and FIG. 4B is a cross-sectional profile of bump 114. The bump 114 is also crater-shaped with a rim 115, but also has a central apex 116 located generally in the center of the crater. The height of the central apex 116 above the surface 120 of the disk is denoted by $h_p$ and is higher than the height $h_r$ of the rim. The heights of the rims and central apexes in bumps 111, 114 are determined by the type of disk material and the laser parameters of pulse energy, pulse width, and spot size at the disk surface. To assure appropriate texturing and to prevent stiction in the disk drive, it is important that the heights of the bumps, i.e. the height $h_r$ of the crater 113 in bump 111 and the height $h_p$ of the central apex 116 in bump 114, be consistent on each disk and from disk to disk during manufacturing.

The Disk with Laser Textured Test Band and Textured Landing Zone

Figure 5:
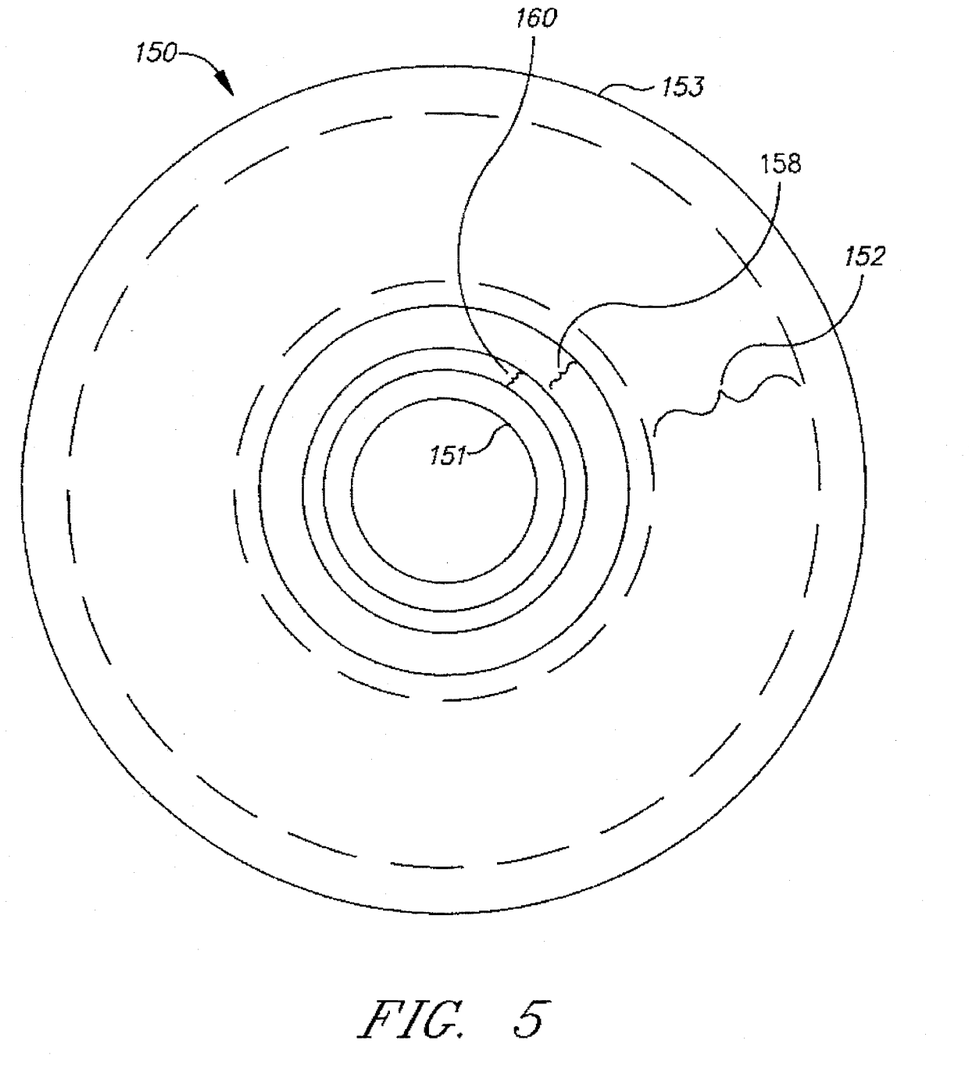
FIG. 5 is a plan view of a disk according to the present invention illustrating the annular data region, the radially spaced annular textured band, and a radially spaced annular test band used to modify the power of the laser pulses directed to the textured band.

FIG. 5 illustrates a magnetic recording disk with a laser-induced textured band according to the present invention. The disk 150 has an inside diameter 151, an outside diameter 153, a conventional annular data region 152 and an annular textured band 158. However, disk 150 also includes a test band 160 of laser-induced bumps. The test band 160 is located near the inside diameter 151 of disk 150 and is also radially spaced from the annular data region 152 and the textured band 158. The laser-induced bumps in both the textured band 158 and the test band 160 are essentially identical to that depicted and described in either FIGS. 3A–3B or FIGS. 4A–4B. However, the bumps in the test band have an average height, i.e., either the rim height $h_r$ for the crater-like bump of FIGS. 3A–3B or the central apex height $h_p$ for the bump of FIGS. 4A–4B, that is usually substantially different from the average height of the bumps in the adjacent textured band 158. This is because the test band 160 is formed first, and then the measured average height of the test band bumps is used to modify one or more laser parameters to form the bumps in the textured band 158 to the correct desired average height. Thus the bumps in the test band 160 are formed in a first spiral track, and the bumps in the textured band 158 are formed in a second spiral track that is discontinuous with the first spiral track.

As will be described in detail below, the disk is manufactured by first forming the test band 160, immediately analyzing the bumps in the test band using the apparatus and process of the present invention, and immediately thereafter forming the textured band 158 by modifying the incident laser parameters at the disk to assure that the average height of the bumps in the textured band 158 is within an acceptable range. In this manner, the texturing pattern in the landing zones for all of the disks will have the desired average bump height and will be consistent from disk to disk.

Figure 6:
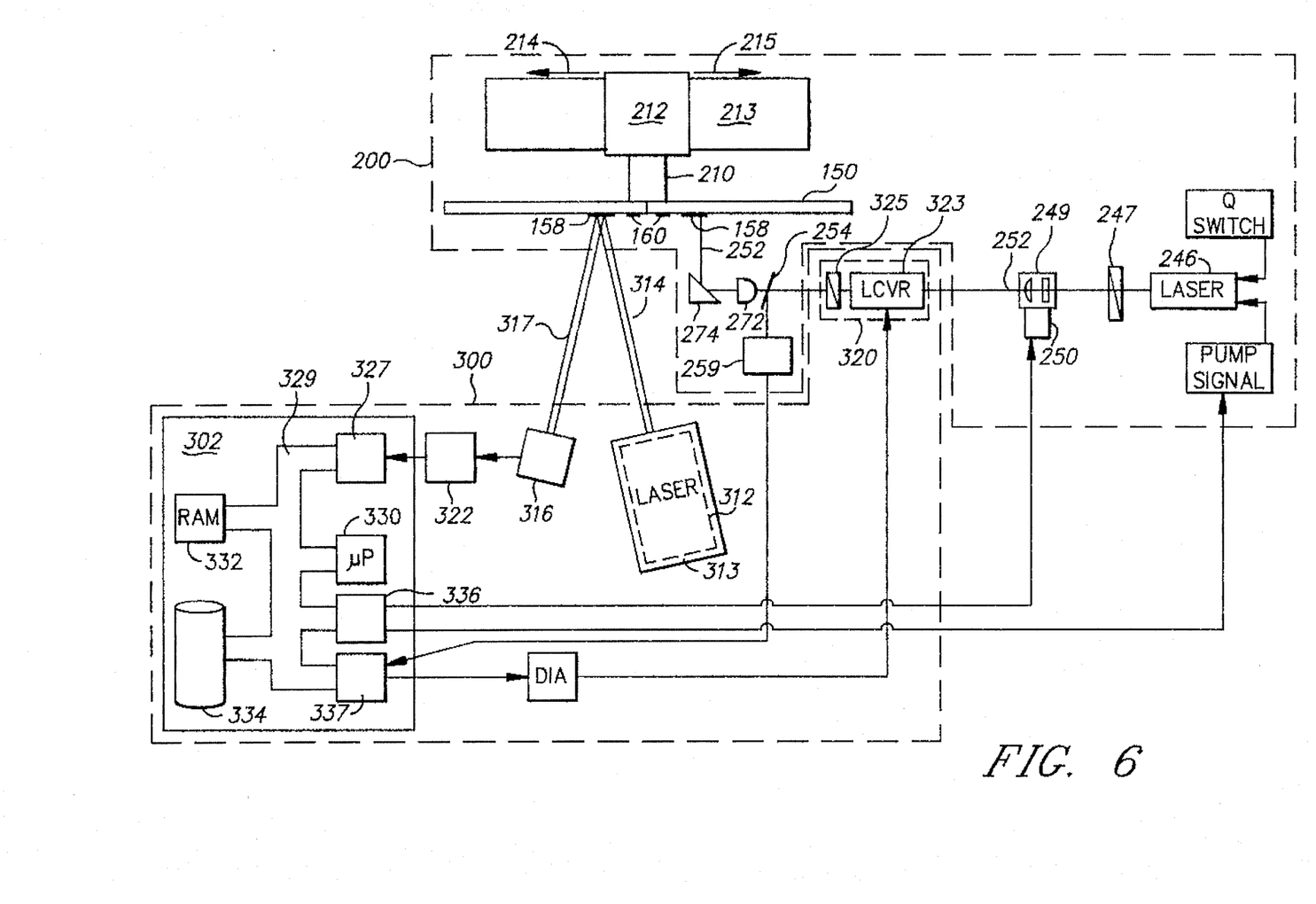
FIG. 6 is a schematic block diagram of the disk texturing system that uses a laser analysis of bumps formed in the disk test band to subsequently modify one or more parameters of laser parameters to form the bumps in the textured band.

The Apparatus and Process for Texturing the Landing Zone with Feedback from the Textured Test Band FIG. 6 is a functional schematic of the apparatus for forming the test and textured bands, and for analyzing the test band to modify the incident laser parameters prior to forming the textured band. The apparatus includes the bump forming laser system 200 and the texture analyzing laser system 300. The disk 150 (FIG. 5) with test band 160 and textured band 158 is supported on a spindle 210 attached to drive motor 212. Drive motor 212 is mounted on a translation stage 213 and is movable in the directions indicated by arrows 214, 215.

The system 200 for forming the bumps in both the test band 160 and textured band 158 includes a Nd:YLF or Nd:YVO$_4$ solid-state laser 246. Laser 246 is controlled by a diode-pumping signal and a Q-switch control. The Q-switch is a well-known technique for greatly increasing the peak power output from a pulsed solid state laser. The Q-switch spoils the Q of the laser cavity and thereby allows a large population inversion to build up. Restoring the Q to a high value allows a short, high-powered pulse to be produced by the laser. Laser 246 generates a pulsed Gaussian beam 252 having, for example, twenty microjoules of energy. The laser pulse width and pulse energy can be varied by changing the diode laser pump power or by changing the pulse repetition rate. In general, there is a one-to-one correspondence between pulse energy and pulse width. Higher energy pulses have shorter pulse width. Pulse energy increases (and hence pulse width decreases) as the diode laser pump power is increased or the repetition rate is decreased.

A fast shutter 247 is located at the laser output to block the laser pulses when desired. The laser beam 252 then passes through a variable collimator 249, a light valve 320 and a beam splitter 254. Beam splitter 254 splits a small portion (e.g., 1%) of the beam 252 and directs it to a power meter 259. The laser beam 252 then passes through an objective lens 272 and a reflecting prism 274 that directs the beam to the disk 150. In FIG. 6, the beam 252 strikes the disk 150 at approximately the "3:00 o'clock" position on the disk, with 12:00 o'clock being the direction normal out of the figure. In operation the motor 212 rotates the disk 150 at 540 RPM. The laser 246 is pulsed at a rate of 10 kHz, and the drive motor 212 is moved on the translation stage 213 in the direction of arrow 214 while the disk 150 is rotating and the laser 246 is pulsing so that the bumps can be formed across the radial dimension of the test and textured bands. In the embodiment for a 3.5 inch disk, the test band 160 has a radial dimension of approximately 0.5 mm and the textured band 158 has a radial dimension of approximately 3 mm. The Gaussian laser beam 252 has a diameter at the focus of approximately 23 microns at the $1/e^2$ intensity points and forms bumps of approximately 15 microns diameter on the disk 150. Bumps having a diameter in the range of approximately 5–30 microns can be formed with the laser system 200. For ease of illustration, the apparatus shown in FIG. 6 is depicted in operation for only one side of disk 150. However, in actual manufacturing the beam 252 can be divided by a cube beam splitter into two beams that are directed by appropriately located mirrors into two symmetric paths so that both sides of the disk 150 can be textured simultaneously.

The texture analyzing laser system illustrated in FIG. 6 is denoted as item 300 within the dashed lines. For ease of illustration, the system 300 is depicted in operation for only one side of disk 150. In actual manufacturing the system 300 is replicated on the opposite side of disk 150 so that both sides of the disk may be analyzed simultaneously. The primary components of the analyzing laser system 300 are a personal computer (PC) 302, a low-power continuous wave (CW) 670 nm laser 312 that directs a laser light beam 314 onto the disk 150 (initially onto test band 160 and later onto textured band 158 after the drive motor is moved along translation stage 213), a scanning linear photodetector array 316 that receives the light beam 317 diffracted from the test or textured bands, the variable collimator 249 that is located in the path of light beam 252 and is controlled by motor 250, and the light valve 320 that is also located in the path of light beam 252.

The general operation of the analyzing laser system 300 with the laser bump forming system 200 is that (a) the first laser 246 operates at a fixed power and pulse width and forms texturing bumps (of the type shown in FIGS. 4A–4B) in the annular test band 160 in the manner previously described; (b) the test band 160 is then irradiated with beam 314 from second laser 312 and the diffracted beam 317 is detected across a range of diffraction angles by array 316; (c) the output of array 316 is received by PC 302 and, in the manner to be described in detail below, is used to compute a value representative of the average height of the bumps in the test band 160; (d) in response to this computed value, the PC 302 outputs a correction signal or signals to one or more of the light valve 320, the laser 246, and the variable collimator 249 to modify parameters of the laser beam 252 from the first laser 246; (e) the disk is translated and the texturing band 158 formed with the modified laser beam 252; and (f) the textured band 158 is then irradiated with laser light beam 314 from the second laser 312 and the diffracted beam 317 is detected by linear array 316 to measure the average height of the bumps in the textured band 158 to ultimately accept or reject the disk. The texture analyzing laser system 300 is thus used to provide automated feedback to the laser forming system 200. However, the analyzing laser system 300 may also function as a stand-alone or ex-situ system. In this case the physical characteristic of the textured pattern, e.g. the average height of the textured marks or bumps or the cross sectional profile of a mark or bump, can be displayed on a display or printed on a printer connected to the PC 302.

The laser 312 is a 670 nm CW laser that provides an output beam 314 at a power level of approximately 0.5 mW and a waist size or beam diameter of approximately 1 mm. The laser 312 is part of laser module 313 that includes the laser power source, a photodiode, a beam splitter that directs a portion of the beam 314 onto the photodiode, a Keplerian telescope and a spatial filter. The signal from the photodiode is fed back to the laser power source to regulate the output power of laser 312. This allows the output power of laser 312 to be stabilized to within +/–0.01% of its nominal operating point. The stabilized output beam of laser 312 is directed into the Keplerian telescope to set the beam diameter to 1 mm. At the focal point within the Keplerian telescope a spatial filter is located and adjusted to greatly improve the transverse mode quality of the stabilized laser beam.

The beam 314 from laser 312 is incident on disk 150 at approximately the 11:00 o'clock position. The beam 314 has a diameter of approximately 1 mm and thus covers the entire radial dimension of the test band 160. It is thus incident simultaneously on a large number or group of bumps in the test band 160. The reflected beam 317 from the test band 160 is diffracted across a range of diffraction angles and detected by individual photodetector elements in the scanning linear array 316.

Figure 7:
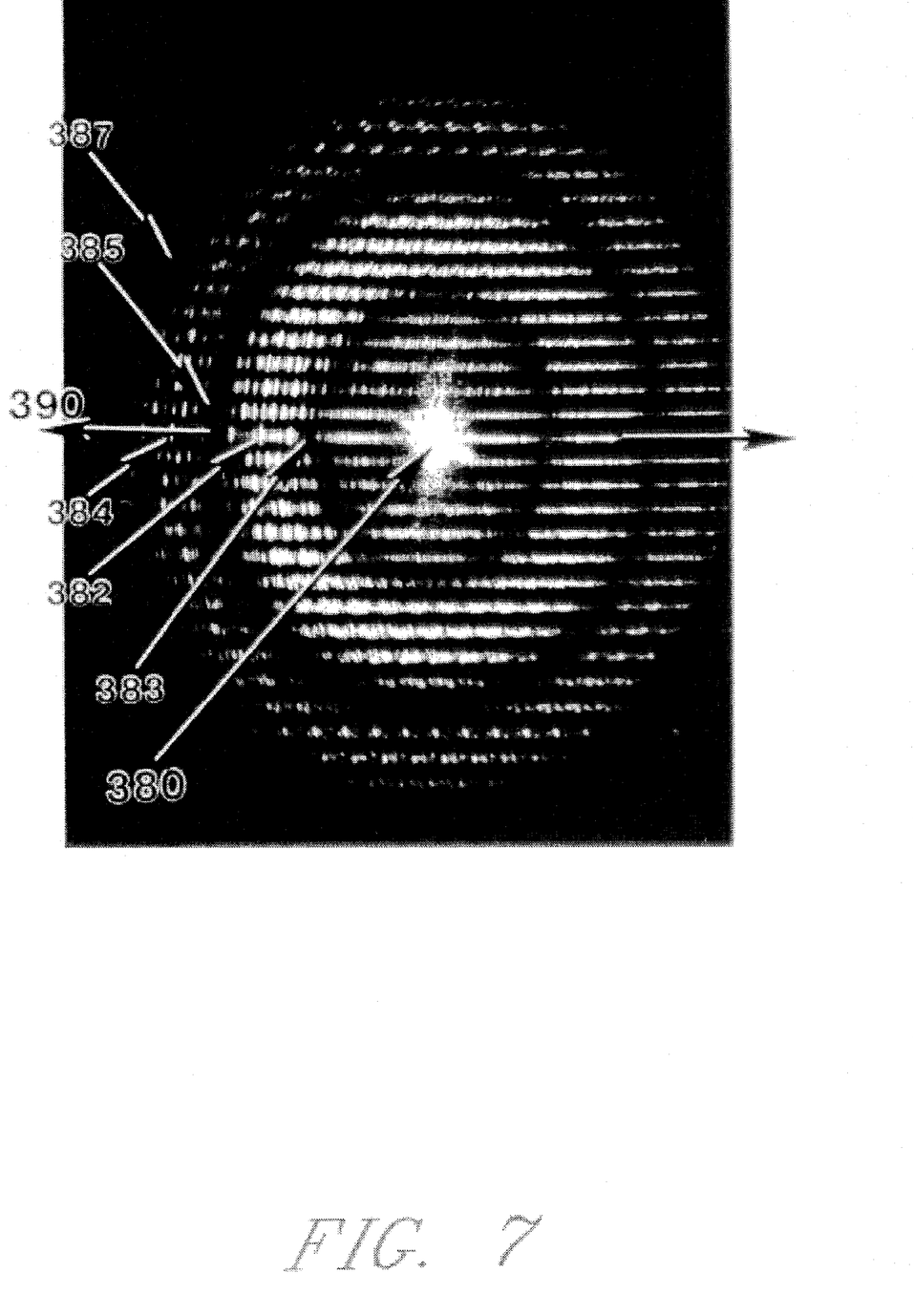
FIG. 7 is a photograph of reflected light showing the diffraction pattern from the disk caused by the pattern of like, generally symmetric laser-induced bumps.

FIG. 7 is a photograph of the beam 317 showing the diffraction pattern spread across a range of angles. The center spot 380 in FIG. 7 represents the specular reflected beam from incident beam 314 and is of no interest in the diffraction pattern. However, a plurality of intensity peaks or rings 382, 384 separated by dark bands 383, 385, 387 are illustrated in FIG. 7. The rings 382, 384 are light intensity peaks or maxima and the bands 383, 385, 387 represent light intensity troughs or minima. The fine structure in FIG. 7 (the horizontal lines and repeating dots along the lines) are caused by the semiperiodic nature of the laser bumps on the disk 150. The Keplerjan telescope in laser module 313 is set so that the spots merge together to form the horizontal lines. The long axis of the array 316 is oriented parallel to the horizontal lines (the alignment axis of array 316 is shown as line 390 in FIG. 7) so that only the envelope of the diffraction pattern is measured and not the fine structure. The beam 314 illuminates the disk close to normal, preferably within 15 degrees of normal. The incident beam 314 and the reflected beam 317 lie in a plane that is aligned normal to the disk and at a tangent to the annular test band 160. Because the linear photodetector elements in array 316 are also aligned in that same plane, they detect the intensity of the diffracted light through a range of diffraction angles in that plane. In the preferred embodiment the array 316 is a EG&G model RL1024SBQ array with 1024 discrete detector elements. The line 390 adjacent the FIG. 7 photo represents the location of the detector elements in the linear array. The output of the array 316 is a distribution of 1024 analog voltage levels corresponding to the angular distribution of light intensities diffracted by the textured surface in the test band 160.

Figure 8:
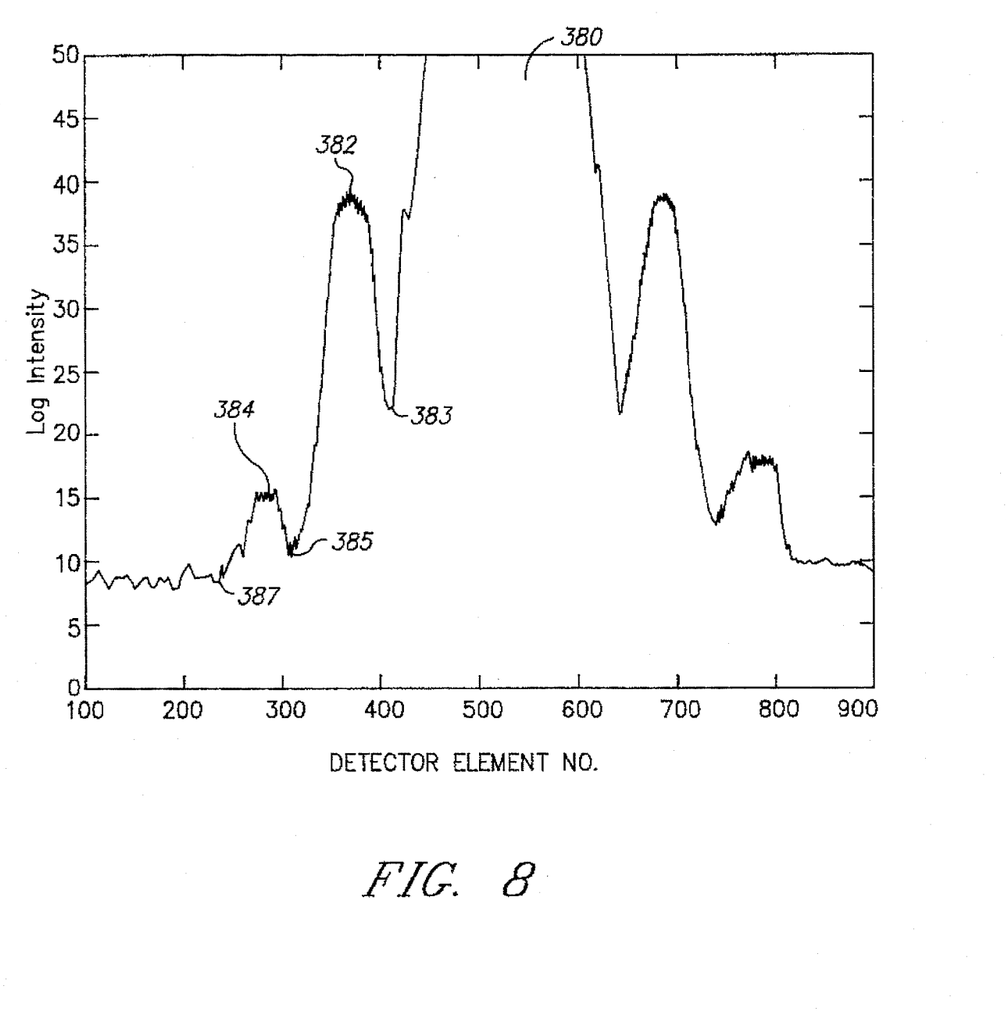
FIG. 8 is a graph of the digitized output of the scanning linear photodector array showing the reflected laser light intensities from the disk as a function of diffraction angle.

FIG. 8 shows the digitized output of array 316 for detector elements 100 to 900. The individual peaks 382, 384 represent the envelopes of the corresponding intensity peaks of FIG. 7, the troughs 383, 385, 387 represent the intensity troughs between the peaks, and the peak 380 represents the specular reflection. The Y axis in FIG. 8 is the log of output intensity and the X axis represents the angle (in terms of numbered array detector element) away from the specularly reflected beam. The angular distribution of intensities shown in FIG. 8 is related to the average physical shape of the bumps illuminated by the light beam 314. In particular, the digitized array output curve in FIG. 8 is the square of the absolute value of the Fourier transform of the cross sectional profile of an average bump. Because the individual bumps in the repetitive texturing pattern are symmetrically shaped, a set of mathematical operations including the inverse Fourier transform operation can be performed on the digitized array output to compute the cross sectional profile of an average bump.

The array 316 is driven by a modified EG&G scanner model RC1030LNN (not shown in FIG. 6). The analog output signal from array 316 is preamplified and sent to signal conditioner 322. Signal conditioner 322 includes circuitry for performing signal gain, offset, filtering and hardware averaging, as well as a 12-bit analog-to-digital digitizer. The scanner and digitizer are controlled by clock and index timing circuitry within conditioner 322. The output of signal conditioner 322 is a digital signal representing 1024 discrete digital values corresponding to the light intensities detected by the 1024 photodetector elements in array 316. The digital output of signal conditioner 322 is directed to commercially available National Instruments AT-DIO-32F card 327 attached to the conventional ISA bus 329 in the PC 302 where it is accessible by the microprocessor 330 and can be immediately processed or stored in RAM 332 or external fixed storage such as hard disk drive 334.

The discrete digital values corresponding to one sample output from array 316 are used to calculate a characteristic of the angular distribution of light intensities. This calculated characteristic is directly related to a characteristic of the physical shape of the texturing bumps by which the incident laser light beam 314 was diffracted. For use in magnetic recording disk texturing the physical shape characteristic of interest is the average height of the bumps, i.e., $h_p$ for the bumps of the type shown in FIGS. 4A–4B. In the preferred embodiment of operation, the array 316 output is sampled as the disk rotates, each sample being a set of 1024 discrete digital values of the angular distribution of light intensities. The sets are stored in RAM 332 and the stored sets averaged. The array 316 is scanned through 1024 points in 4 ms with the disk rotating at 540 RPM. This results in 28 sectors being sampled around the disk. Each sector may thus be analyzed to give information on the circumferential variation of the bump height.

In the preferred embodiment the characteristic of angular distribution of light intensities that is used is the integrated intensity value integrated over a portion of the angles near a peak intensity, such as for example between detector elements 310 and 410 in FIG. 8 around peak 382 corresponding to the first diffraction ring from the center of the pattern. This calculated integrated intensity value, along with the position (i.e., the number of the detector element, approximately detector element 370) is then used to determine the average bump height. After the microprocessor 330 computes the integrated intensity and peak position values it compares them to previously calibrated values corresponding to known bump heights from a look-up table stored in hard disk drive 334. The calibrated values stored in the look-up table are determined by first measuring the average height of bumps in calibration disks using scanning tunneling microscopy (STM) or atomic force microscopy (AFM). These instruments can measure the bump rim height $h_r$ and bump apex height $h_p$ of the laser bumps with an accuracy of approximately 1 nm. The integrated intensity and peak position values near the first and second diffraction rings on these calibrated disks are then correlated with the AFM measured bump rim or apex heights and stored as a look-up table in hard disk drive 334.

Figure 9:
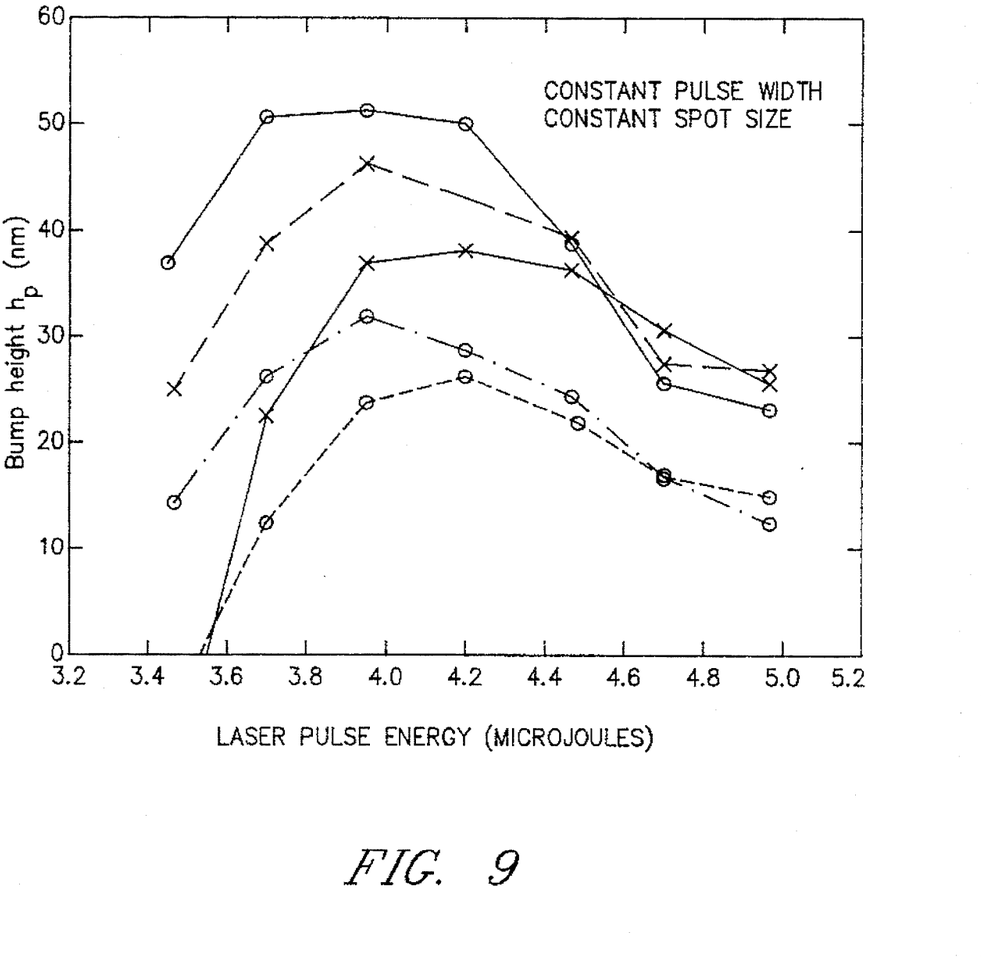
FIG. 9 is a group of curves showing average bump height as a function of laser energy at constant laser pulse width and spot size for a group of laser textured disks.

If the measured bump heights in the test band are too high or too low, the program in the PC 302 estimates new laser parameters (e.g., pulse energy, pulse width, and/or spot size) to bring the bump heights to within specification. All three parameters strongly affect bump height. The primary parameter is variation of pulse energy and the secondary parameter is variation of laser pulse width. The laser spot size can also be varied by variable collimator 249 that comprises two separated lenses. The spacing of the two lenses can be adjusted by motor 250, which can be a linear motor or a PZT stack. However, in the preferred embodiment, the variable collimator 249 is not varied and thus the laser spot size at the disk is held fixed. Experiments on a range of nominal to extreme NiP disk substrates have established semi-quantitatively how the disks respond to changes in the laser parameters. For example, if the pulse energy is varied at constant pulse width and spot size on a given disk, the center apex bump height $h_p$ will pass through a maximum at a particular value of the laser energy. FIG. 9 is a set of such laser energy curves at a constant pulse width and spot size for different NiP disk substrates, ranging from extreme high to extreme low. Data like that represented in FIG. 9 is stored in hard disk drive 334 and is accessible by the microprocessor 330 to determine the pulse energy, and pulse width if necessary, that are needed to generate bumps with the desired average bump height.

The pulse energy actually reaching the disk is monitored by the beamsplitter 249 and power meter 259 located immediately after the light valve 320. The output of conventional power meter 259, Metrologic model 45-450, is input to a National Instruments AT-MIO-16D card 337 (FIG. 6) on ISA bus 329 in PC 302. If pulse energy adjustment is necessary because the bump heights are too high or too low, as determined by calculating the integrated intensity and peak position values of the first and second diffraction rings from the test band 160 and comparing these values with the look-up table, the microprocessor 330 signals the card 337 to output a 16-bit word to D/A converter 340. The D/A converter 340 provides an analog square wave voltage signal to light valve 320. The light valve 320 is a commercially-available Meadowlark Optics liquid crystal variable retarder (LCVR) 323 and a fixed polarizing beamsplitter 325. The analog voltage out of D/A converter 340 is applied to LCVR 323. The LCVR 323 changes the polarization of light beam 252 in response to the applied voltage. Thus, depending on the applied voltage to LCVR 323, a variable portion of light from beam 252 is allowed to pass through fixed polarizing beamsplitter 325. The result is that the energy of the laser pulses reaching disk 150 is controllable by the voltage applied to LCVR 323.

For most disks a pulse energy adjustment by controlling the LCVR 323 is sufficient to bring the height of the bumps to within specification. However, for some the disks the maximum bump height $h_p$ at the peak of the energy curve (FIG. 9) may still too low. In such cases the bump height is increased by decreasing the laser pulse width. The pulse width is decreased by increasing the diode laser pump power to laser 246 using the National Instruments General Purpose Interface Board (GPIB) 336 on ISA bus 329 in PC 302. The pulse width may also be varied by adjusting the pulse repetition rate of laser 246. In general, when the pulse width is changed it is necessary to readjust the light valve 320 to bring the transmitted pulse energy reaching the disk back to the desired value.

In the preferred embodiment the laser pulse energy is modified by controlling the LCVR 323 through card 337. However, the laser pulse energy may also be varied by modifying the laser spot size with variable collimator 249 through motor 250 controlled by GPIB 336. The laser spot size can be controlled independently of or in combination with the laser pulse energy.

While in the preferred embodiment the integrated intensity and position values of the first peak (382 in FIG. 8) in the angular distribution of intensities is used to determine the average bump height, it is also possible to use the square of the absolute value of the Fourier transform to determine the average cross-sectional profile of the symmetrically-shaped bumps. The angular distribution of light intensities (like that in FIG. 8 but modified to add the information in the specular beam 380 in the manner described below), is in fact the square of the absolute value the Fourier transform of the cross sectional profile of the bumps. This is because the bumps have the same shape. Because the individual bumps are also symmetrically-shaped, a set of mathematical operations can be performed on the stored 1024 discrete digital values (or sets of values) to yield the average cross sectional shape of the bumps illuminated by the analyzing laser 314. However, before a distribution like that shown in FIG. 8 can be used to determine the complete cross sectional profile of the bumps an adjustment must be made for the specular beam 380. Specular beam 380 contains low spatial frequency information about the bumps. As it is shown in FIG. 8, the specular beam 380 is saturating the detector elements of array 316. To recover this low spatial frequency information in the vicinity of the specular beam 380 it is necessary to use a second light valve (not shown in FIG. 6) between laser 312 and the disk 150. The second light valve is used to reduce the intensity of the light reaching the disk 150 from the laser 312. At this reduced laser energy level, which does not saturate the detector elements near the specular beam, the shape of the specular beam is then measured before and after the laser bumps are formed on the disk. The difference between the before and after values of the intensities near the specular beam is approximately the diffraction signal near the specular beam, i.e., the low spatial frequency information of the laser bumps. The laser 312 intensity is then increased by the second light valve to measure the high spatial frequency information contained, for example near the first and second diffraction rings 382, 384, respectively. The high and low spatial frequency information is then combined into a single angular distribution of light intensities. This combined angular distribution is the square of the absolute value of the Fourier transform of the cross sectional profile of the bumps. Mathematical operations are then performed on these values (or sets of values). First the square root of the intensities is obtained. Then the sign of the resulting square root values in the even-numbered diffraction rings is made negative. For example, in FIG. 8 this would be for the square root values of the intensities between minima 385 and 387 (the second diffraction ring). Then the inverse Fourier transform is applied to this resulting distribution of 1024 mathematically adjusted values. The result yields the average cross sectional shape of the bumps illuminated by the analyzing laser 314.

Procedure for Texturing the Disk Using the Test Band and Feedback from the Analyzing Laser The following are the process steps for using the system described and shown in FIG. 6 to texture the disk landing zone with laser-induced bumps of the desired height:

1. Move disk drive motor 212 on translation stage 213 so that analyzing laser 314 illuminates a non-textured portion of disk 150 and acquire and store a background set of digital values from array 314.
2. While moving the drive motor 212 in the direction 214 on translation stage 213 and rotating the disk 150 at 540 RPM pulse the laser 246 at 10 kHz with preselected pulse widths, a preselected voltage setting on LCVR 323, and a preselected spot size from the setting of variable collimator 249. This creates a spiral track of laser-induced bumps spaced apart approximately 50 microns. This spiral track is the test band 160 with a radial dimension of 0.5 mm.
3. Close shutter 247.
4. Illuminate the entire radial dimension of test band 160 with analyzing laser 314 to acquire a first set of digital values from array 316.
5. Subtract the first set of digital values from the stored background set from step 1 to get the actual set of digital values corresponding to an angular distribution of light intensities diffracted by the pattern of laser bumps in the test band 160. Repeat this a number of times while the disk 150 is rotating, store the sets of digital values, and compute a set of average values from the stored sets on the disk 150.
6. Compare the averaged angular distribution with known calibration distributions of intensities for calibration disks with known bump heights and shape. Do this by determining the position and integrated intensity of the first and second diffraction peaks or rings 382, 384. Compare these values with those of the calibrated disks to determine values of average bump height. This is done using a look-up table or a set of equations that describes the relationship between the bump height and the first and second diffraction ring positions and integrated intensities. The following is pseudo-code describing this operation in detail:

P1=position of first peak (photodector element number)
P2=position of second peak (photodector element number)
Int1=Integrated intensity of first peak
Int2=Integrated intensity of second peak
BH=calculated bump height If 150<P1<165 and 102.1<P2−P1<130 and 1<Int1/Int2<30 BH=0.0007*Int1+9.0 nm
If 165<P1<167 and 102.1<P2−P1<130 and 1<Int1/Int2<30 BH=0.0007*Int1+6.0 nm
If 167<P1<177 and 102.1<P2−P1<130 and 1<Int1/Int2<30 BH=0.0007*Int1+3 nm
If 155<P1<169 and 100.0<P2−P1<101.9 and 1<Int1/Int2<30 BH=0.0005*Int1+12.6 nm
If 169<P1<170 and 100.0<P2−P1<101.9 and 1<Int1/Int2<30 BH=0.0005*Int1+9.5 nm
If 170<P1<177 and 100.0<P2−P1<101.9 and 1<Int1/Int2<30 BH=0.0005*Int1+7.0 nm
If 157<P1<177 and 90.0<P2−P1<99.5 and 1<Int1/Int2<30 BH=0.0007*Int1−1.5 nm
If 150<P1<165 and 101.9<P2−P1<102.1 and 1<Int1/Int2<30 BH=0.0006*Int1+10.8 nm
If 167<P1<177 and 101.9<P2−P1<102.1 and 1<Int1/Int2<30 BH=0.0006*Int1+5 nm
If 150<P1<169 and 99.5<P2−P1<100.0 and 1<Int1/Int2<30 BH=0.0006*Int1+5.5 nm If 169<P1<177 and 99.5<P2−P1<100.0 and 1<Int1/Int2<30 BH=0.0006*Int1+3.0 nm If 165<P1<167 and 101.9<P2−P1<102.1 and 1<Int1/Int2<30 BH=0.0006*Int1+7.8 nm 7. If the bump heights are within specification, proceed to step 11 without changing the laser 246 parameters.

8. If the bump heights are too high or too low, determine which side of the bump height vs. pulse energy curve (FIG. 9) the test band is on. This is done by looking at the angular position (the number of the detector element in FIG. 8) of the peak intensity of the first diffraction ring (peak 382 in FIGS. 7 and 8). Experimental data shows that the diffraction angle of peak 382 is at the same point for all disks at the peak of their respective bump height vs. pulse energy curves (FIG. 9). If the peak 382 of the first diffraction ring occurs at a smaller value than this known point, then the bumps on the test band are on the "overheated" side of the bump height vs. energy curve. If the peak 382 of the first diffraction ring appears at a larger value than this known point, then the bumps on the test band are on the "underheated" side of the bump height vs. energy curve.

9. Using the look-up table based on data similar to that of FIG. 9, determine whether it is possible to bring the bump heights into specification by modifying pulse energy alone. If yes, establish a new pulse energy using the PC-controlled light valve 320.

10. If the bump height will still be too low even at the peak of the bump height vs. energy curve, reduce the laser 246 pulse width slightly using the GPIB interface to the laser 246. (Experimental data shows that decreasing the pulse width at constant pulse energy increases the bump height on disks with low bump heights.)

11. Move drive motor 212 along translation stage 213 to the radial position where the textured band 158 for the landing zone is to begin. Open shutter 247. While continuing to rotate the disk 150 and moving the drive motor 212 along the translation stage 213 in the direction of arrow 214, pulse the laser 246 at 10 kHz with the modified voltage setting on LCVR 323 (or modified pulse width if step 10 is performed). This creates a spiral track of laser-induced bumps spaced apart approximately 50 microns. This spiral track is the textured band 158 with a radial dimension of 3 mm.

12. Close the shutter 247, illuminate the textured band 158 with laser 312 to measure the average bump height in the textured band 158 as described previously for the test band 160, and then accept or reject the completed disk based on the measured height.

While the preferred embodiments of the present invention have been illustrated in detail, it should be apparent that modifications and improvements may be made to the invention without departing from the spirit and scope of the invention as described in the following claims.

What is claimed is:

1. An apparatus for analyzing a substrate surface having a pattern of generally repetitive surface texturing, the apparatus comprising:

a laser light source positioned relative to the substrate so that the laser light beam strikes the textured substrate surface;

a photodetector array positioned to receive laser light diffracted from the textured substrate surface through a range of angles, the array providing an output signal representative of the angular distribution of diffracted light intensities across said range of angles;

signal processing circuitry coupled to the array for generating from the array output signal a set of discrete digital values representative of the intensity of the light at a like set of angles; and a processor coupled to the signal processing circuitry for calculating from the digital values a characteristic of the angular distribution of diffracted light intensities and for correlating said calculated angular distribution characteristic to a characteristic of a known surface texture pattern, the processor providing an output signal representative of a characteristic of the physical shape of the surface texture pattern illuminated by the laser light beam.

2. The apparatus according to claim 1 wherein the calculated characteristic of the angular distribution of diffracted light intensities is a peak intensity, and wherein the processor output signal is representative of an average height of the peaks of the surface texture pattern illuminated by the laser light beam.

3. The apparatus according to claim 1 wherein the calculated characteristic of the angular distribution of diffracted light intensities is an integration of the intensities over a portion of the range of angles near a peak intensity, and wherein the processor output signal is representative of an average height of the peaks of the surface texture pattern illuminated by the laser light beam.

4. The apparatus according to claim 1 further comprising storage means coupled to the processor for storing a plurality of sets of discrete digital values, and wherein the processor also averages the stored sets of digital values prior to calculating the characteristic of the angular distribution of diffracted light intensities.

5. The apparatus according to claim 4 further comprising means attached to the substrate for moving the substrate relative to the laser light beam.

6. The apparatus according to claim 1 wherein the substrate is a magnetic recording disk, wherein the repetitive surface texturing is a plurality of generally like laser-induced bumps extending in an annular band around the disk, and wherein the laser light beam has a diameter sufficient to cover a plurality of individual bumps.

7. The apparatus according to claim 6 wherein the processor provides an output signal representative of the average height of the plurality of bumps illuminated by the laser light beam.

8. A process for determining a physical characteristic of a pattern of generally like texturing bumps formed on a substrate, the process comprising:

directing a laser light beam to the substrate, the laser light beam having a diameter sufficient to cover a plurality of adjacent texturing bumps on the substrate;

scanning with a photodetector array the laser light diffracted from the substrate through a range of angles to provide a photodetector array output signal representative of the angular distribution of diffracted light intensities across said range of angles;

generating from the photodetector array output signal a set of discrete digital values representative of the intensity of the light at a like set of angles;

calculating from the generated digital values a characteristic of the angular distribution of diffracted light intensities; and determining from the calculated angular distribution characteristic a characteristic of the physical shape of the texturing bumps illuminated by the laser light beam, the step of determining a characteristic of the physical shape of the texturing bumps including the step of correlating the calculated angular distribution characteristic to an angular distribution characteristic of texturing bumps having a known physical shape.

9. The process according to claim 8 wherein the calculated characteristic of the angular distribution of diffracted light intensities is an integration of intensities over a portion of the range of angles near a peak intensity, and wherein the step of determining a characteristic of the physical shape of the texturing bumps comprises determining from the integrated intensity an average height of the peaks of the texturing bumps illuminated by the laser light beam.

10. The process according to claim 8 further comprising the steps of, prior to calculating the characteristic of the angular distribution of diffracted light intensities, storing a plurality of sets of discrete digital values and averaging the stored sets of digital values.

11. The process according to claim 10 further comprising, after storing a first set of discrete digital values representative of the intensity of light diffracted from a first group of texturing bumps, moving the substrate relative to the incident laser light beam so the laser light beam covers a different group of texturing bumps on the substrate.

12. An apparatus for analyzing a substrate surface having a pattern of generally repetitive surface texturing, the apparatus comprising:

a laser light source positioned relative to the substrate so that the laser light beam strikes the textured substrate surface;

a photodetector array positioned to receive laser light diffracted from the textured substrate surface through a range of angles, the array providing an output signal representative of the angular distribution of diffracted light intensities across said range of angles;

signal processing circuitry coupled to the array for generating from the array output signal a set of discrete digital values representative of the intensity of the light at a like set of angles; and a processor coupled to the signal processing circuitry for calculating from the digital values a characteristic of the angular distribution of diffracted light intensities, the processor providing an output signal representative of a characteristic of the physical shape of the surface texture pattern illuminated by the laser light beam; wherein the angular distribution of diffracted light intensities is the square of the absolute value of the Fourier transform of the cross-sectional profile of the surface texture pattern illuminated by the laser light beam, and wherein the processor output signal is representative of the cross-sectional profile of the surface texture pattern illuminated by the laser light beam.

13. A process for determining a physical characteristic of a pattern of generally like texturing bumps formed on a substrate, the process comprising:

directing a laser light beam to the substrate, the laser light beam having a diameter sufficient to cover a plurality of adjacent texturing bumps on the substrate;

scanning with a photodetector array the laser light diffracted from the substrate through a range of angles to provide a photodetector array output signal representative of the angular distribution of diffracted light intensities across said range of angles;

generating from the photodetector array output signal a set of discrete digital values representative of the intensity of the light at a like set of angles;

calculating from the generated digital values a characteristic of the angular distribution of diffracted light intensities; and determining from the calculated angular distribution characteristic a characteristic of the physical shape of the texturing bumps illuminated by the laser light beam; wherein the calculated characteristic of the angular distribution of diffracted light intensities is the square of the absolute value of the Fourier transform of the cross-sectional profile of the surface texture pattern illuminated by the laser light beam, and wherein the step of determining a characteristic of the physical shape of the texturing bumps comprises determining from the square of the Fourier transform a cross-sectional profile of the texturing bumps.

\* \* \* \* \*